United States Patent
Cooper et al.

(10) Patent No.: US 10,564,800 B2
(45) Date of Patent: Feb. 18, 2020

(54) METHOD AND APPARATUS FOR TOOL SELECTION AND OPERATION IN A COMPUTER-GENERATED ENVIRONMENT

(71) Applicant: SPATIALAND INC., Venice, CA (US)

(72) Inventors: Kyle W. Cooper, Malibu, CA (US); Kimberly Cooper, Malibu, CA (US); Amir Alavi, Atlanta, GA (US); Brian C. Holmes, Los Angeles, CA (US)

(73) Assignee: SPATIALAND INC., Venice, CA (US)

( * ) Notice: Subject to any disclaimer, the term of this patent is extended or adjusted under 35 U.S.C. 154(b) by 0 days.

(21) Appl. No.: 15/902,640

(22) Filed: Feb. 22, 2018

(65) Prior Publication Data

US 2018/0239515 A1  Aug. 23, 2018

Related U.S. Application Data

(60) Provisional application No. 62/462,858, filed on Feb. 23, 2017.

(51) Int. Cl.
| | |
|---|---|
| G06F 3/0481 | (2013.01) |
| G02B 27/01 | (2006.01) |
| G06F 3/0484 | (2013.01) |

(52) U.S. Cl.
CPC ....... *G06F 3/04815* (2013.01); *G02B 27/017* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 9,778,814 B2 | 10/2017 | Ambrus et al. | |
| 2015/0331576 A1* | 11/2015 | Piya | G06F 3/011 |
| | | | 715/850 |
| 2017/0185261 A1 | 6/2017 | Perez et al. | |

(Continued)

FOREIGN PATENT DOCUMENTS

CN  105912110 A  8/2016

OTHER PUBLICATIONS

Sangalli et al., SculptAR: An Augmented Reality Interaction System, IEEESymposiumon3DUserInterfaces(3DUI), Mar. 2017, pp. 260-261, Virtual Reality Group—Computer Science School—PUCRS, Brazil.

*Primary Examiner* — Jeffrey J Chow
(74) *Attorney, Agent, or Firm* — Fitch, Even, Tabin & Flannery LLP

(57) ABSTRACT

Method and apparatus for facilitating virtual object selection and interaction in a computer-generated environment such as a virtual or augmented reality 3-D environment are disclosed. A physical controller allows interaction by the user with a tool displayed at a first position in the computer-generated environment where, when a first signal is received from the physical controller to initiate selection of the tool, a visual cue is created in the computer-generated environment. The visual cue includes a vector that allows targeting of the tool and is displayed with respect to a virtual controller that is a graphical representation of the physical controller in the computer-generated environment. Upon receipt of a selection signal from the physical controller when the vector and the tool intersect, the computer-generated environment is updated to display the tool at a second location that is relative to the virtual controller.

15 Claims, 14 Drawing Sheets

(56) References Cited

U.S. PATENT DOCUMENTS

2017/0329419 A1* 11/2017 Dearman .............. G06F 3/0346
2017/0363867 A1* 12/2017 Poulos ............... G02B 27/0103
2018/0033204 A1    2/2018 Dimitrov et al.
2018/0158250 A1*  6/2018 Yamamoto ............. G06T 19/20

* cited by examiner

METHOD AND APPARATUS FOR TOOL SELECTION AND OPERATION IN A COMPUTER-GENERATED ENVIRONMENT

CROSS-REFERENCE TO RELATED APPLICATIONS

This application claims priority to and the benefit of provisional patent application No. 62/462,858 filed in the U.S. Patent and Trademark Office on Feb. 23, 2017, the entire content of which is incorporated herein by reference.

BACKGROUND

Field

Aspects of the present disclosure relate generally to user interfaces, and more particularly, to a method and apparatus for tool selection and operation in a computer-generated environment.

Background

Current user interface approaches for performing tasks in computer-generated environments such as virtual reality and augmented reality environments are cumbersome, requiring users to open and select menus and submenus to perform simple tasks.

It would be desirable to provide more intuitive modalities for users to interact with computer-generated environments.

SUMMARY OF THE PREFERRED EMBODIMENTS

The following presents a simplified summary of one or more aspects of a method and apparatus for tool selection and operation in a computer-generated environment in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Instead, its sole purpose is to present some concepts of one or more aspects of the disclosure in a simplified form as a prelude to the more detailed description that is presented later herein.

Tool selection within the computer-generated environment, as configured in accordance with various aspects of the disclosure, is an interactive process that may be accomplished by a user using either one or two hands. The process, which follows an intuitive approach, is made up of a combination of actions designed to be as familiar to the user as they would be if they were performed in the physical world but made better because these actions may be enhanced in the computer-generated environment. For example, the user may utilize natural human actions such as gazing, pointing, selecting, and grasping to interact with various virtual objects, such as one or more tools from a tool set, in the computer-generated environment. However, various aspects of the present disclosure also provide the user with almost superhuman-like abilities that are still intuitive for the user to adopt.

In an example interaction with a virtual object such as a tool in the computer-generated environment, the user may gaze towards the tool and call forth, using a physical controller, the display of a graphical object to be used as a visual cue for interacting with the tool. The visual cue may be displayed alongside a virtual controller that is a graphical representation of the physical controller in the computer-generated environment. In one aspect of the disclosure, the visual cue may be implemented in the computer-generated environment using a vector line that appears to originate from the virtual controller. Specifically, the vector includes an origin that is based on the spatial coordinates of the virtual controller within the computer-generated environment. In addition, the vector includes an orientation that may be changed by the user utilizing the physical controller. For example, with the physical controller in the upright and forward-facing position, the vector line would extend directly forward. Any movement or deviation of the physical controller from the upright or forward orientation will cause the vector line to deviate accordingly in virtual space. Thus, a particular visual cue may be displayed and be directed by the user and may reach as far as an edge of a view of the computer-generated environment or may be made to intersect with a virtual object in its path.

In one aspect of the disclosure, a tool set is presented to the user in the computer-generated environment as a grid of 3-D objects in a virtual space. The virtual objects that make up the tools in the tool set occupies a defined volume of space that may be mapped using coordinates in the virtual space, such as by using 3-D coordinates. In accordance with various aspects of the disclosure, the defined volume, also referred to as an object space, may include not only 3-D volumes such spheres, cubes, boxes, or polygons, but also 2-D, planar elements such as rectangles, squares, ovals, and circles.

In another aspect of the disclosure, the user may select a tool of interest by moving the visual cue so as to visually intersect with an object space or planar element associated with the tool. To determine a selection of the tool of interest, it is determined: (1) whether the user maintains the intersection of the visual cue with the object space of the tool, and (2) further if a selection signal is received from the user pressing a selection button on the physical controller. Similarly, determination of the selection by the user of a virtual object that is a planar element may involve detection of an intersection of the visual cue with the planar element. In general, and as further described herein, selection of a particular virtual object may be detected by determining if the user has manipulated a graphical object in the computer-generated environment so as to intersect an object space or a planer element associated with the virtual object. It should be understood that the term object space will be used to generically refer to objects having volume space as well as planar elements. For example, if a tool is a set of commands that is displayed as a panel, which is a 2-D shape, then that tool would have a planer element associated with it.

In yet another aspect of the disclosure, once it is determined that the user is interested in selecting the tool, such as by detecting the user causing the visual cue to intersect with the object space, the tool may be visually changed to indicate that the intersection has occurred, as further described herein.

In still yet another aspect of the disclosure, once the user has actually confirmed a desire to select the tool, such as by using the selection button on the physical controller as discussed above, the user will have the ability to pull the tool close enough to grasp, even if the tool is located at a distance away in the virtual space of the computer-generated environment. From the perspective of the user, when the user maintains an intersection between the visual cue generated along its associated vector line and the tool and presses the selection button on the physical controller, the tool will appear to fly along the vector line towards the user. As the visual origin of the vector line is based on the virtual controller belonging to the user, it will appear to the user as if the user can command the tool to move through space as if the user had the power of telekinesis.

In yet a further aspect of the disclosure, the tool may stop within reach of the user in the virtual space, which allows the user to grab or grasp the tool complete a tool activation process. For example, the tool may be grasped by the user extending the virtual controller to intersect with the object space of the tool, which is now located at new coordinates near the user within the computer-generated environment. Pressing the grasp button will thus associate the tool with the virtual controller. Alternatively, instead of stopping near the user in the virtual space, the tool, once selected by the user, will continue to move along the vector line and then intersect and become associated with the virtual controller of the user.

These and other sample aspects of the disclosure will be described in the detailed description that follow, and in the accompanying drawings.

BRIEF DESCRIPTION OF THE DRAWINGS

Various aspects of the disclosure will be described in the detailed description that follow, and in the accompanying drawings. In accordance with common practice, some of the drawings may be simplified for clarity. Thus, the drawings may not depict all of the components of a given apparatus (e.g., device) or method.

Like reference numerals may be used to denote like features throughout the specification and figures.

DETAILED DESCRIPTION

Figure 1:
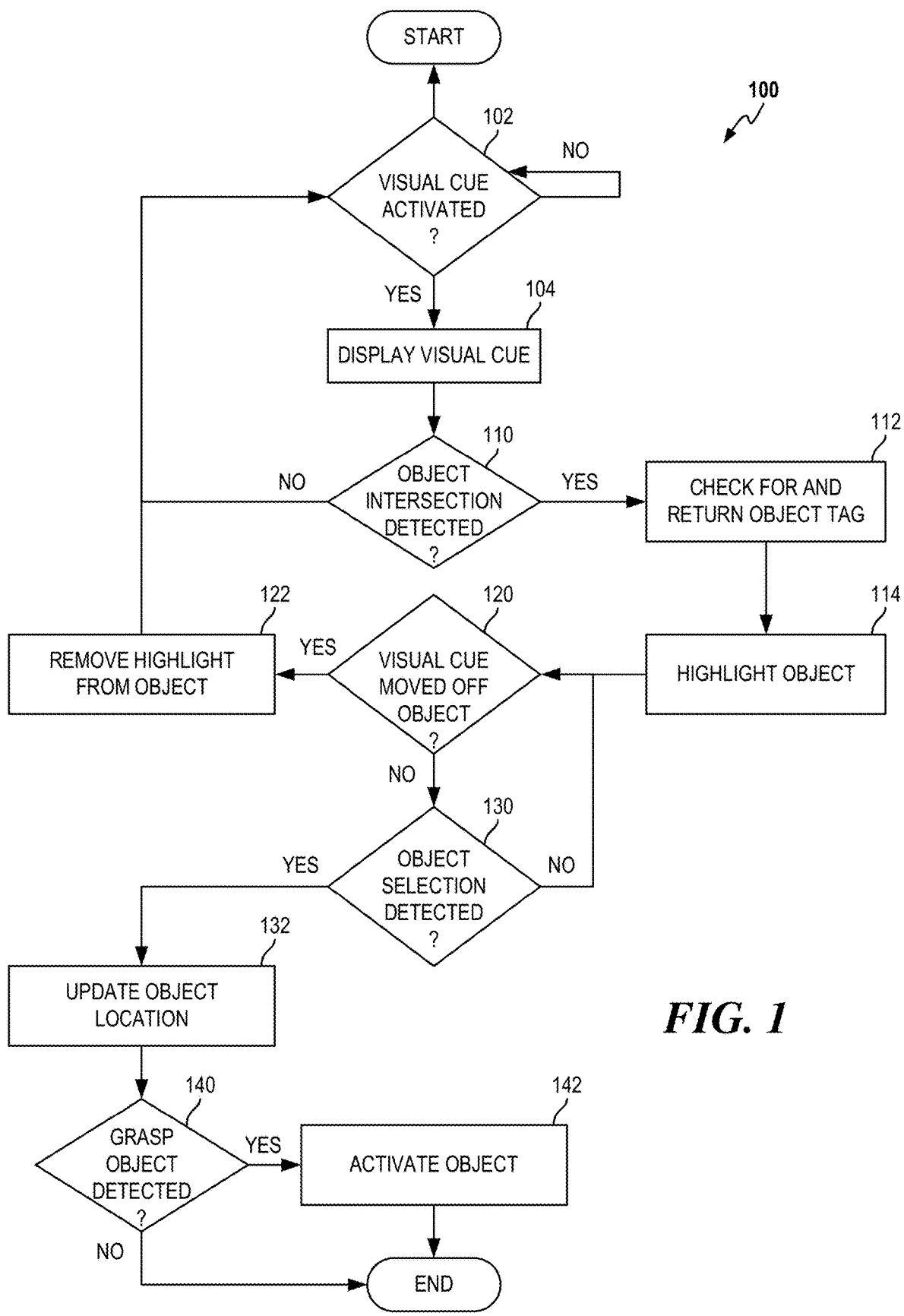
FIG. 1 is flow diagram illustrating a process for virtual object selection in a computer-generated environment that is configured in accordance with various aspects of the present disclosure.

The detailed description set forth below in connection with the appended drawings is intended as a description of various configurations of the method and apparatus for tool selection and operation in a computer-generated environment and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure provided herein provides an interface for the computer-generated environment that offers an intuitive approach to tool selection and operation for a user in a computer-generated environment. The description contained herein reference a computer-generated environment as an example of the computer-generated environment, which may refer to virtual reality (VR) and/or augmented reality (AR) environments. The interface is configured to be as familiar to the user as they would be in the physical world but enhanced for user interaction with virtual objects in the computer-generated environment. These virtual objects may include a variety of tools implemented virtually so as to allow a seamless transition for the user into the computer-generated environment. For example, the functionality provided by various aspects of the disclosure replicates the way an artist would paint with a paint palette and brush in the real world by implementing the paint palette and brush as virtual objects in the computer-generated that function almost identically to their real-world counterparts.

In accordance with various aspects of the disclosure, a user interface includes a head-mounted display as well as one or more physical controllers that may be worn by the user so that feedback to, as well as input from, the user may be provided and received respectively. For example, the head-mounted display may be configured to project a view of the computer-generated environment to the user. Head movements of the user, detected by the interface using the head-mounted display, may be interpreted as input from the user to allow the interface to update the view of the computer-generated environment. In addition to the head-mounted display, one or more physical controllers may also be used to allow the user to interact with the user interface. These physical controllers are typically implemented as hand-held controllers that are mated to the head-mounted display to allow the user to trigger actions within the computer-generated environment. These actions can replicate pointing, grasping, or trigger-like functions within the computer-generated environment.

A head-mounted display, in general, is an apparatus that fits over the head of a viewer and includes one or more display panels that project a three-dimensional (3-D) image suitable for delivery to both eyes. One typical approach for displaying stereoscopic images is to project two offset images separately to each of the viewer's eyes. The offset images provide an illusion of depth and may be matched to the interpupillary distance of the viewer to provide comfortable immersion within the computer-generated environment.

In contrast, identical images projected onto both eyes will not provide the illusion of depth but, instead, result in the perception of a two-dimensional (2-D) image. The head-mounted display may enable rotational and positional tracking of the viewer either by using a series of accelerometers and gyroscopes to calculate relative position, or by utilizing precisely positioned infrared LEDs that are monitored by tracking sensors that surround the viewer.

In one aspect of the disclosure, the view of the computer-generated environment that is provided to the user is based on a direction in which the user is gazing, and that direction is controlled by the user via the head-mounted display. Specifically, the head-mounted display may include sensors that allow the interface to detect an intended movement of the gaze of the user. These sensors may include accelerometers, gyroscopic sensors, or infrared LEDs that are detected via lasers in nearby tracking stations. In addition, as noted above, the head-mounted display may be mated with one or more hand-held controllers using which the user may interact and activate various functions within the computer-generated environment while wearing the head-mounted display. The hand-held controllers may be tracked using the same technology implemented for tracking the head-mounted display, such as accelerometers and gyroscopes, or infrared laser-based tracking. Tracking of the hand-held controllers allows the interface to detect movement of the user's hands. The user may activate buttons on the hand-held controllers to provide additional inputs to the interface.

In another aspect of the disclosure, the view of the computer-generated environment that is provided to the user may include a graphical representation of the hand-held physical controllers as virtual controllers. As used herein, the term "virtual controller" will refer to a version of a physical controller that is displayed to the user in the computer-generated environment. The virtual controller, as displayed, may resemble the shape of the physical controller or be different therefrom. For example, the virtual controller may appear as an outline of a physical controller surrounding the display of the hand of the user in the computer-generated environment. In some situations, the virtual controller may not even be displayed at all without affecting the functionality provided by the virtual controller. For example, although only the hand of the user may be displayed, the interface may still take into account any interaction of a construct of the virtual controller associated with the hand with another object in the computer-generated environment, as further described herein.

FIG. 1 illustrates a process 100 configured in accordance with various aspects of the disclosure where, at 102, it is determined if a visual cue has been activated. In one aspect of the disclosure, the visual cue may be activated by the user pressing a button or a switch on a physical controller such as one of a plurality of controllers 1444 in, and described in reference to, FIG. 14. The button may also be referred to as a "visual cue button." The visual cue may remain activated as long as the user continues to press the visual cue button. In another aspect of the disclosure, the visual cue may be activated by the user momentarily pressing the visual cue button where, once it has been activated, the visual cue may remain activated until the user deactivates the visual cue, such as by the user pressing the visual cue button again or selecting a different switch on the physical controller. The visual cue may also remain activated if the user holds down the visual cue button and become deactivated once the user releases the visual cue button. If the visual cue has been activated, then operation continues with 104. Otherwise, the selection process 100 may continue to wait for the user to activate the visual cue.

Figure 14:
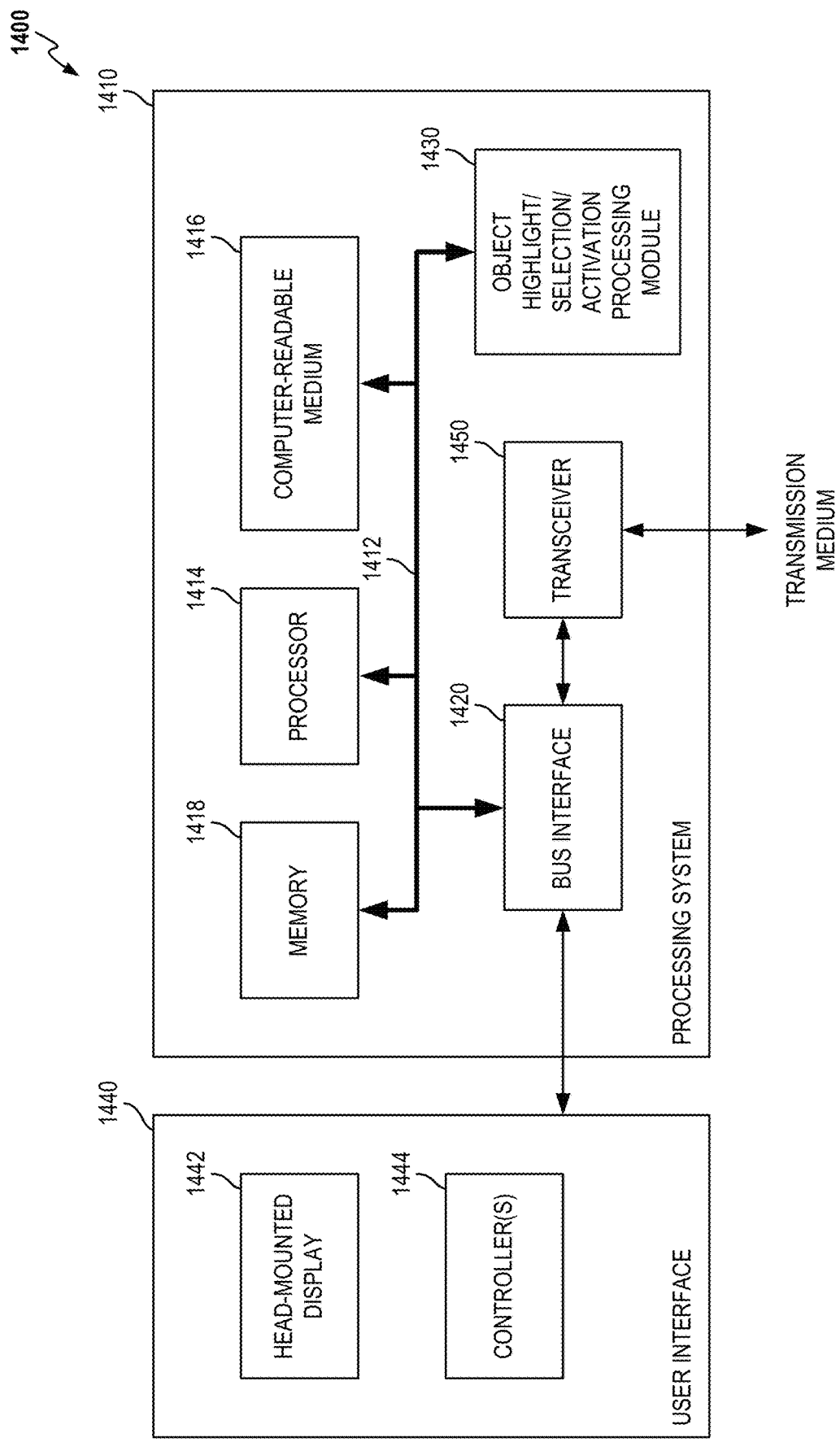
FIG. 14 is a block diagram illustrating an example of a hardware implementation of an apparatus employing a processing system configured for providing object interaction in a computer-generated environment.

At 104, a visual cue is displayed to the user in a head-mounted display such as a head-mounted-display 1442 of FIG. 14. In one aspect of the disclosure, the visual cue is continually displayed as a line that originates from a graphical rendering of a physical controller in the computer-generated environment that is referred to herein as a virtual controller, where the line moves in accordance with a detected movement of the physical controller. The line may be implemented as a vector with an origin relative to a position of the virtual controller and an orientation based on the orientation of the virtual controller. In this aspect, the user may see the visual cue rendered as a line extending from the virtual controller and when the user moves the physical controller, thereby changing the orientation of the virtual controller, the line will move accordingly. It should be noted that if the graphical representation of the virtual controller is not in view, then the start of the line will appear to come outside of the view of the user. In another aspect of the disclosure, the visual cue may move in accordance with a detected direction of the gaze of the user. As discussed above, the direction in which the user is gazing in the computer-generated environment may be determined using the head-mounted display. Once the visual cue is displayed, operation then continues with 110.

Figure 2:
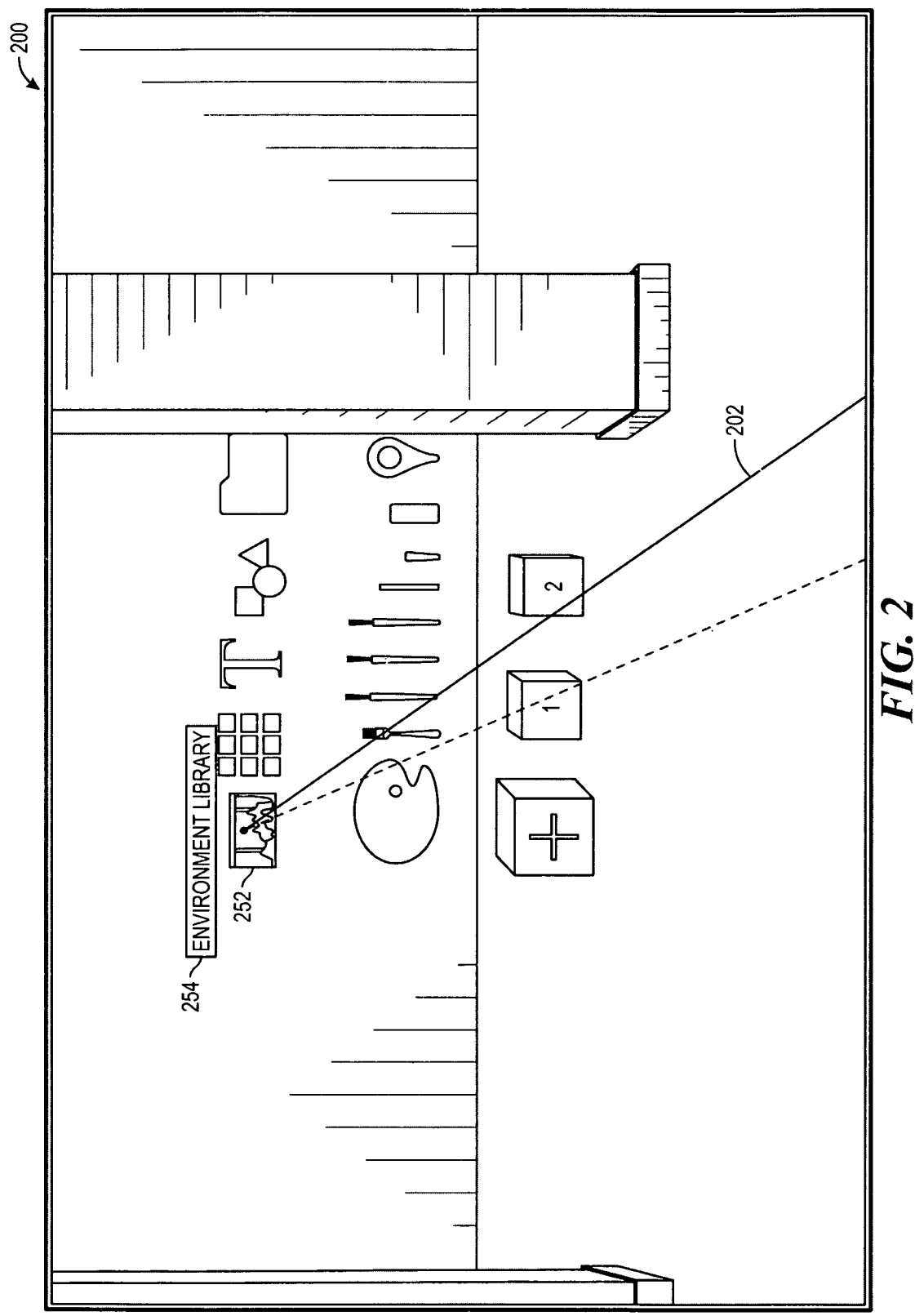
FIG. 2 illustrates a first view of the computer-generated environment that may be displayed to a user when the user utilizes a visual cue to highlight a first virtual object in the computer-generated environment as a part of the selection process of FIG. 1.

FIG. 2 illustrates a 2-D view 200 that is a rendering of a 3-D view as seen by the user through the head-mounted display, where the visual cue has been rendered as a line, also referred to as a visual cue 202. In one aspect of the disclosure, the vector is a construct for information about the visual cue. As used herein, the terms "visual cue", and "line" may be used interchangeably to refer to any graphical representation of the vector that is displayed in the computer-generated environment. Further, the terms "vector" and "vector line" may also be used interchangeably.

At 110, it is determined if the visual cue intersects with a volume associated with a virtual object in the computer-generated environment, the volume being a construct representing the virtual object and referred to as an "object space". In the example provided herein, the user may see this event as the visual cue being brought into an intersection with a tool in the computer-generated environment. In general, a determination of whether there is an intersection between the visual cue and a particular virtual object is based on a determination of an intersection between the vector associated with the visual cue and an object space associated the particular virtual object. As used herein, any reference to an intersection between the visual cue and a virtual object in the computer-generated environment should be understood to be based on a determination of the intersection between the vector of the visual cue and the object space of the virtual object. If it is determined that the visual cue has intersected with the object space, then operation continues with 112. Otherwise, operation returns to 102 and, if the visual cue remains activated (or where the user has not deactivated the visual cue), the visual cue may continue to be displayed at 104. Thus, the selection process 100 may loop through the determination of whether the visual cue remains activated at 102 and the updating of the display of the visual cue at 104 until an intersection between the visual cue and the object space has been determined.

At 112, an object associated with the object space, referred to as an "object of interest", is identified. In one aspect of the disclosure, an object tag that is associated with each virtual object may be used to uniquely identify and thereafter interact with the object of interest. For example, the object tag may be a reference to a data structure storing information for the object of interest. This data structure may be stored in a database that may also include data structures for all the objects in the computer-generated environment. The data structure may contain information related to the attribute of the object of interest, such as position, size/shape/volume, etc., including information about the object space associated with the object of interest. Where the object of interest is a tool, for example, the information may also include information about the tool itself, such as, where the tool is a brush, size/shape/behavior, etc., of the brush. Operation continues with 114 after the object tag for the object of interest is returned.

Figure 3:
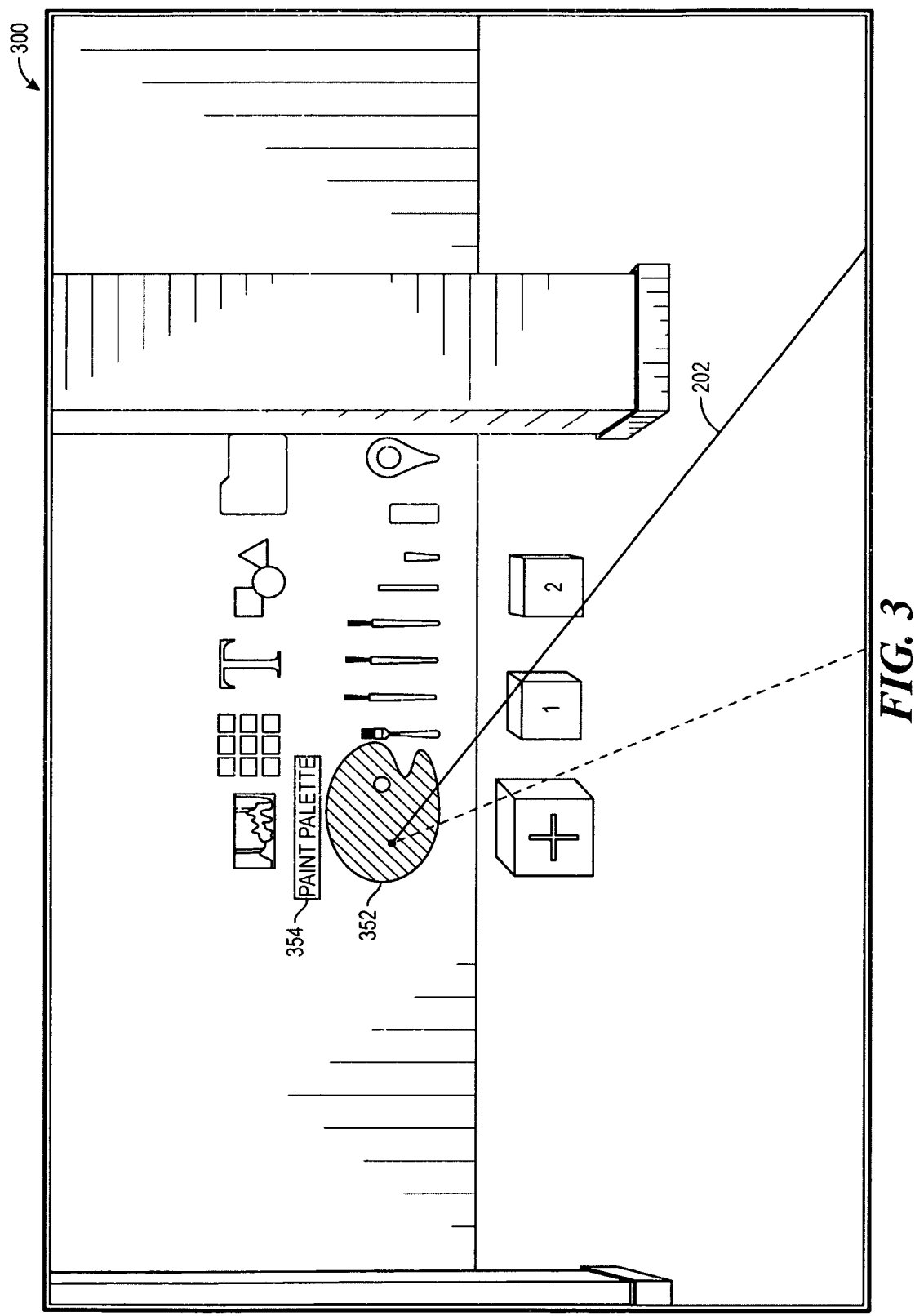
FIG. 3 illustrates a second view of the computer-generated environment that may be displayed to the user when the user utilizes the visual cue to highlight a second virtual object in the computer-generated environment as a part of the selection process of FIG. 1.

At 114, the object of interest is highlighted. In one aspect of the disclosure, a name of the object of interest is retrieved using the object tag returned from 112 and displayed near (e.g., next to, above, etc.) the object of interest in the head-mounted display. Referring again to FIG. 2, an example of this type of highlighting is a display of a label 254 ("Environment Library") for a virtual object 252 when it is determined that the visual cue 202 is intersecting with the virtual object 252. In another aspect of the disclosure, a color of an object may also be changed to indicate (i.e., highlight) that object is the object of interest. For example, if objects are typically displayed using a grey color, a blue color may be used to display the object of interest (i.e., the color of the object of interest changes from grey to blue). In yet another aspect of the disclosure, a size of an object may also be enlarged in the head-mounted display to indicate that the object is the object of interest. For example, the object of interest may be displayed as growing to 125% of its normal size. FIG. 3 provides a highlighting example where the object of interest is a tool such as a paint palette 352 that is illustrated in a 2-D rendering of a view 300 as seen by the user through the head-mounted display of the computer-generated environment. The highlight of the paint palette 352 is achieved by displaying a label 354 ("Paint Palette") bearing the name of the object of interest as well as changing the color and size of the object of interest.

At 120, it is determined if the user has moved the visual cue such that there is no intersection between the vector associated with the visual cue and the object space of the object of interest. In other words, from the perspective of the user in the head-mounted display, the user has "moved off" the visual cue from (or away) the object of interest. If it is determined that the vector associated with the visual cue does not intersect the object space of the object of interest anymore, then operation continues with 122. Otherwise, operation continues with 130.

At 122, where it has been determined that the visual cue is no longer intersecting with the object of interest (the user has moved the vector associated with the visual cue such that it does not intersect with the object space of the object of interest), then any highlighting applied during operation at 114 may be removed/reversed. Returning to the example at 114 where the object was previously highlighted by the display of the label, and changes in color (from grey to blue) and size (enlarged), then removal of the highlighting would include a removal of the display of label (the name not being further displayed), and changes of color (from blue to grey) and size (decreased to its original size). Operation then returns to 102.

At 130, where it has been determined that the vector associated with the visual cue is still intersecting the object space of the object of interest (the user has maintained the visual cue on the object of interest), it will be determined if the user has activated a button on the physical controller, referred to as a selection button, to provide a selection signal to select the object of interest. If it is determined that the user has activated the selection button on the physical controller, then operation continues with 132. Otherwise, if the user has not activated the selection button on the physical controller, then operation returns to 120, where it is determined if the vector associated with the visual cue still intersects the object space of the object of interest. Thus, the selection process 100 may loop through the determination of whether the vector associated with the visual cue intersects with the object space of the object of interest at 120 and the determination of whether the selection button has been activated at 130. It should be noted that an object may remain highlighted in a manner pursuant to the discussion at 114 while that object remains the object of interest.

At 132, once the object of interest has been selected by the user activating the selection button, the object of interest, referred to now as a selected object, may be displayed in the head-mounted display as coming towards the user along a particular trajectory. In one aspect of the disclosure, the trajectory starts from a starting location of the selected object (which is the position of the object of interest before the selection signal is provided by the user) to a new location that may be right in front of the user in the computer-generated environment. The trajectory may be determined using a linear interpolation (LERP) function that animates movement of the selected object using a set of starting coordinates (START{x,y,z}), a set of destination coordinates (END{x,y,z}), and a speed of movement. Because of the animation, the selected object may appear to fly towards the user when the user selects the object of interest using the selection button. In one aspect of the disclosure, the illusion of the user having the ability to call the object of interest closer may be strengthened by having the selected object move towards the user only when the user holds down the selection button. In another aspect of the disclosure, the set of destination coordinates may be based on the origin of the vector associated with the visual cue, thereby providing the illusion that the object of interest is flying towards the virtual controller along the path of the visual cue. In this aspect, the selected object would appear to fly towards the hand of the user as the user would generally associate the virtual controller to be the hand of the user in the computer-generated environment.

Figure 4:
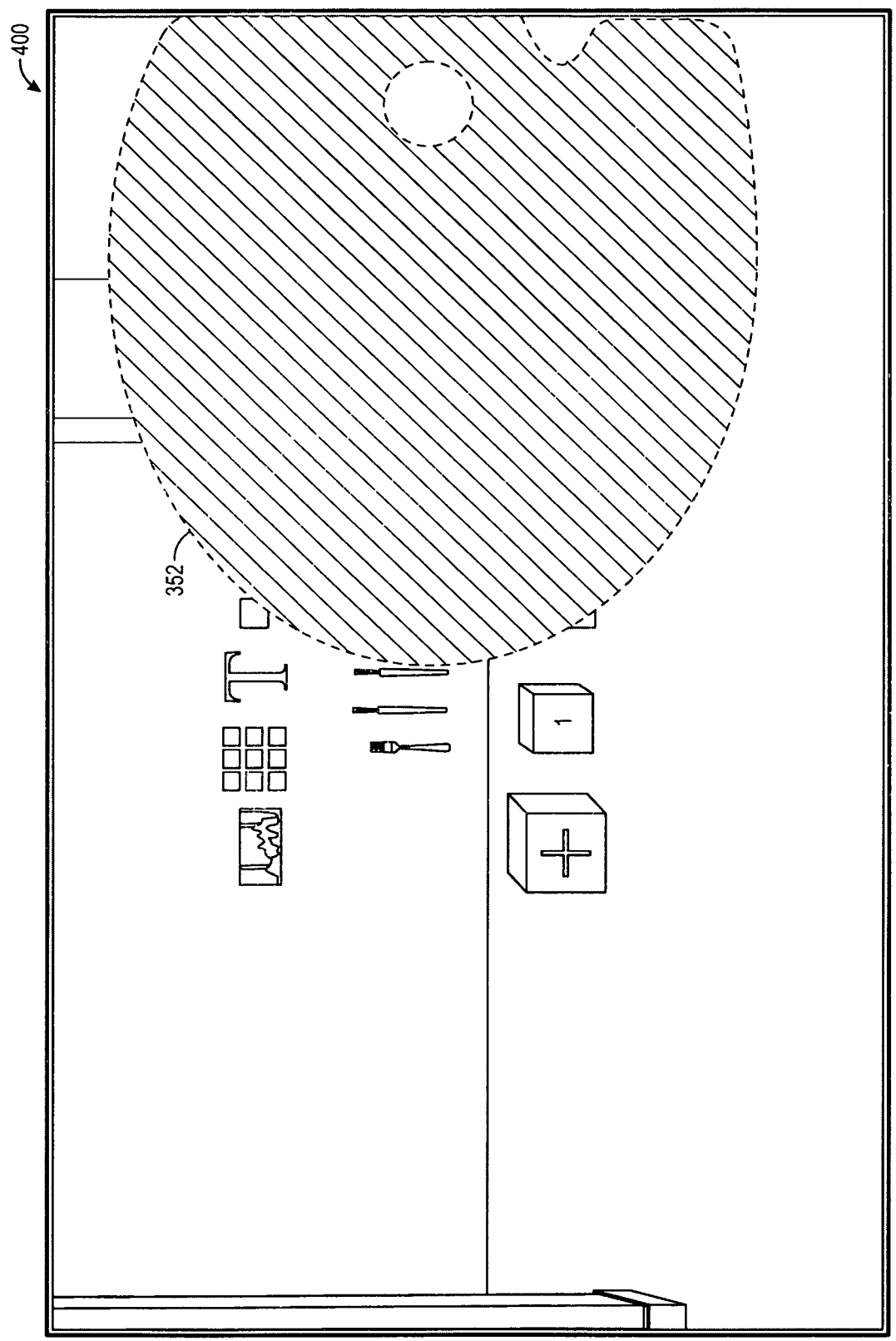
FIG. 4 illustrates a third view of the computer-generated environment that may be displayed to the user when the user selects the second virtual object in the computer-generated environment as a part of the selection process of FIG. 1.

In one aspect of the disclosure, operation of the selection process 100 may continue with 140 after the animation is completed (e.g., after the animation shows that the selected object has reached its new location). However, in another aspect of the disclosure, the selected object may have its highlighting removed either before the animation starts or after the animation ends and before operation of the selection process 100 continues with 140. In addition, the visual cue as displayed at 104 may also be deactivated. Deactivation of the visual cue from 104 and removal of the highlighting applied at 114 may assist to inform the user that further action by the user is necessary to actually use, or activate, the selected object, as further described herein. Returning to the example of where the object of interest/selected object is a tool such as the paint palette 352 as illustrated in FIG. 3, FIG. 4 illustrates a 2-D rendering of a view 400 seen by the user through the head-mounted display of an end of a movement animation of the paint palette 352, where the highlighting of the paint palette 352 using the display of name and change in color has been reverted but the size of the selected object has been increased commensurate with the proximity to the user in the computer-generated environment.

Figure 5:
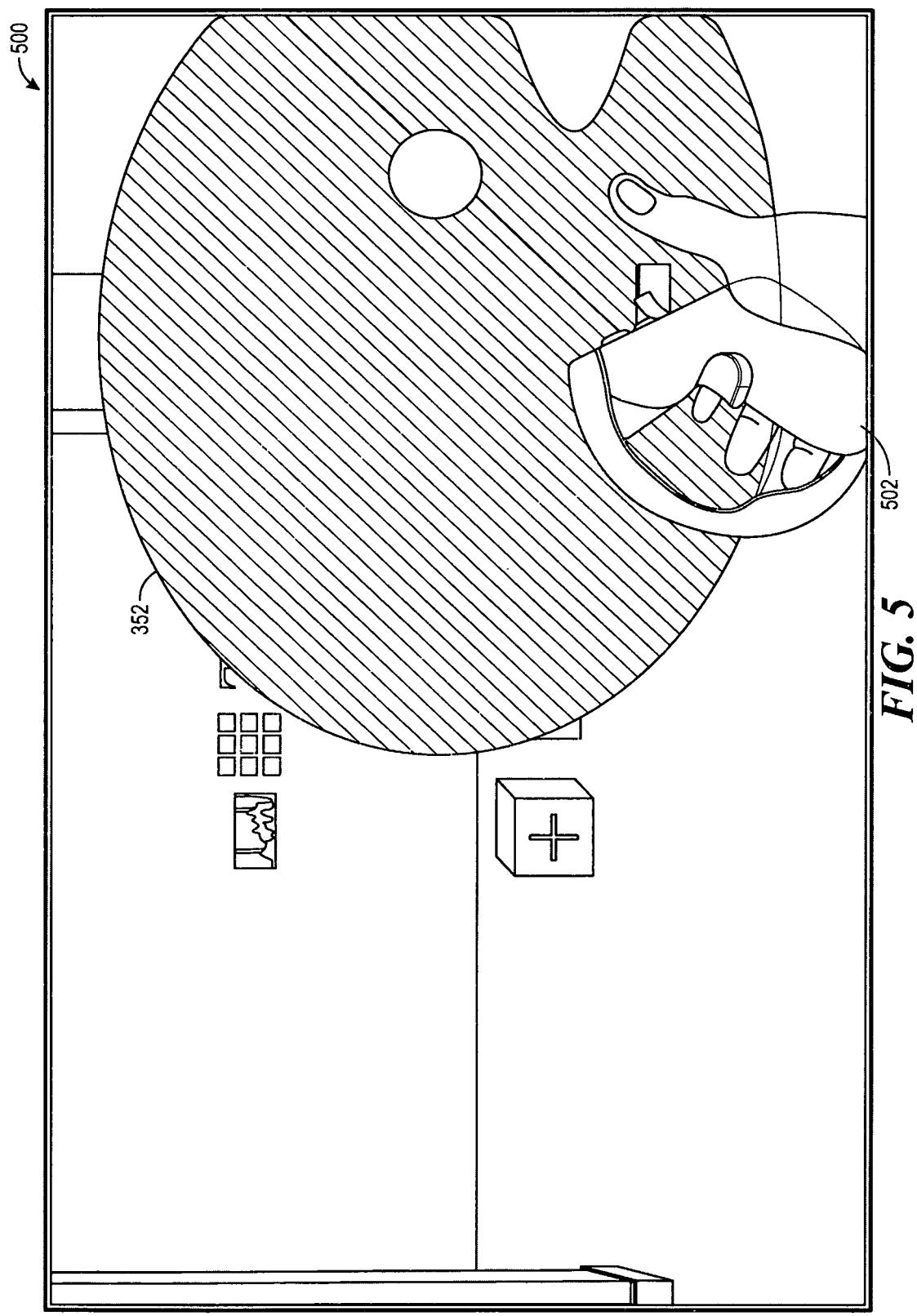
FIG. 5 illustrates a fourth view of the computer-generated environment that may be displayed to the user when the user contacts the second virtual object using a virtual controller in the computer-generated environment as a part of the selection process of FIG. 1.

At 140, it is determined whether the user grasps the selected object, which has been brought to the location in front of the user at 132. In one aspect of the disclosure, the determination is made by first determining whether the virtual controller, which has an associated volume in the computer-generated environment referred to as a virtual controller object space, intersects the object space of the selected object. FIG. 5 illustrates a 2-D rendering of a view 500 seen by the user through the head-mounted display where a virtual controller 502 has been brought into intersection of the paint palette 352. As shown in the example, the paint palette 352 may be highlighted in a different color to provide a cue to the user that the intersection has occurred (and the paint palette 352 may be grasped).

Figure 6:
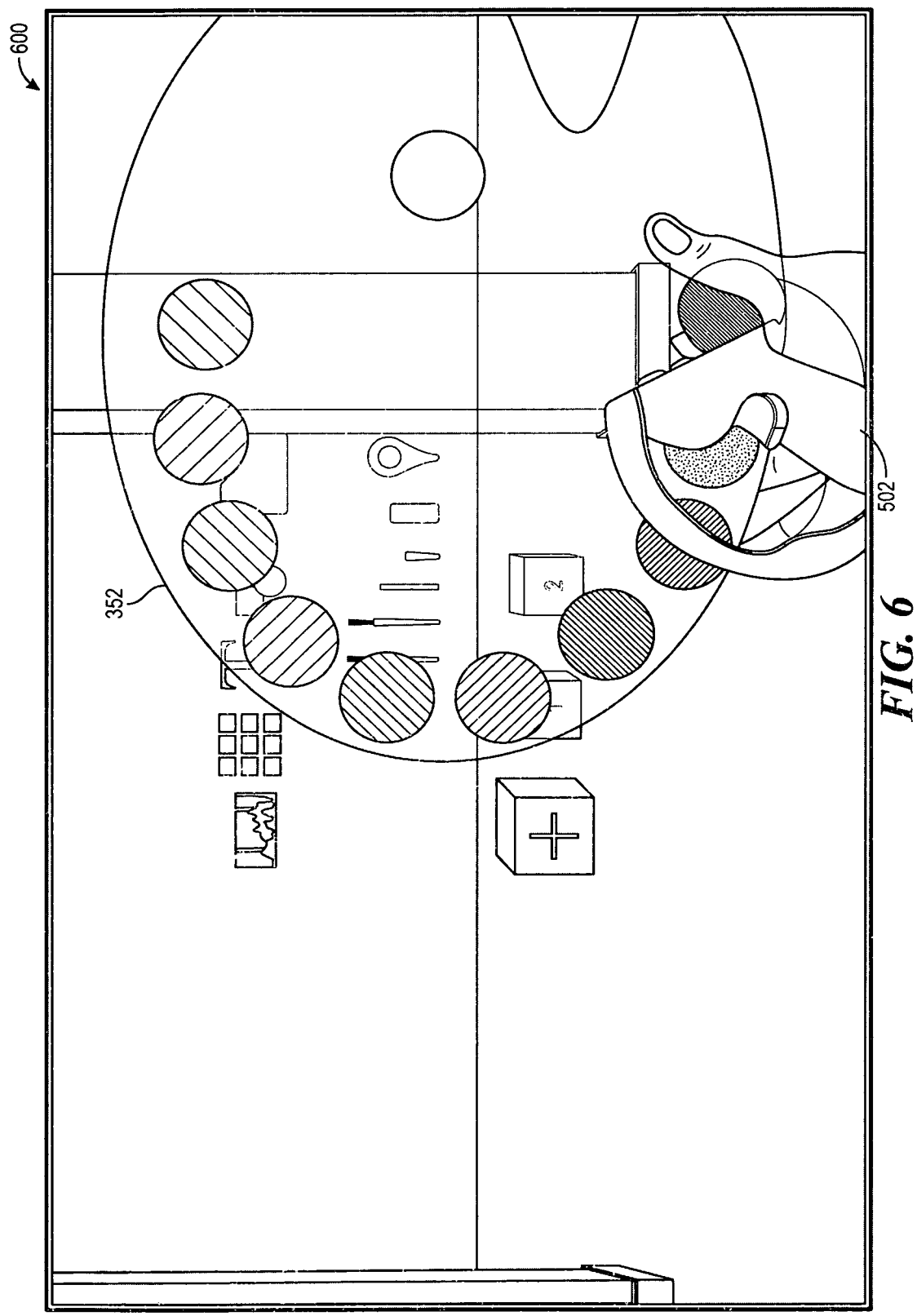
FIG. 6 illustrates a fifth view of the computer-generated environment that may be displayed to the user after the user has activated the second virtual object to become associated with the virtual controller in the computer-generated environment as a part of the selection process of FIG. 1.

If there is an intersection between the virtual controller object space and the object space of the selected object, and if a grasp signal is detected from an activation of a grasp button on the physical controller by the user, then the selected object may be grasped by the virtual controller and operation of process 100 may continue to 142 where the selected object may be grasped/activated. FIG. 6 illustrates a 2-D rendering of a view 600 seen by the user through the head-mounted display where the paint palette 352 has been grasped with the virtual controller 502 by the user in the computer-generated environment.

Alternatively, if there is no intersection of the virtual controller object space with the object space of the selected object, or if there is no grasp signal detected, then the selection process 100 may continue to wait for an occurrence of both the intersection and the grasp signal. It should be noted that at this point in the operation of the selection process 100 if the visual cue has been deactivated, then the user may reactivate the visual cue to identify a new object of interest, leaving the selected object at its current location (where the animation at 132 left the selected object).

Figure 7:
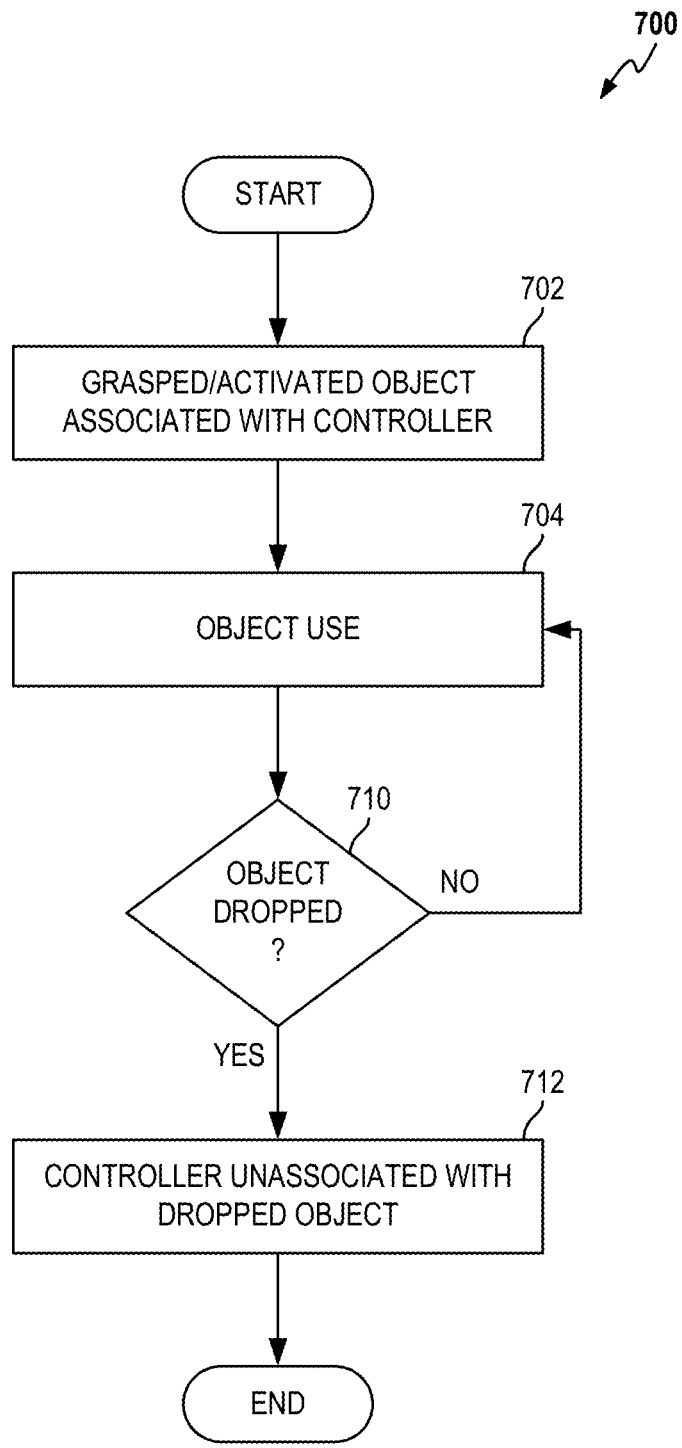
FIG. 7 is flow diagram illustrating a process for activating a virtual object in a computer-generated environment that is configured in accordance with various aspects of the present disclosure.

FIG. 7 illustrates a process 700 that provides details to 142 of FIG. 1, which begins after the user has grasped the selected object in the selection process 100 as determined at 140, referred to herein as a grasped object. In one aspect the grasped object may be considered an activated object that is associated with the virtual controller because the grasped object will appear to move with the virtual controller. For example, at 702, the virtual controller in the computer-generated environment with which the user used to grasp the grasped object becomes the parent of the grasped object. In one aspect of the disclosure, the coordinates of the grasped object may become a child of the coordinates of the virtual controller. In other words, the location of the grasped object in the computer-generated environment, which may be determined by its coordinates, is based on the location of the virtual controller. Once this association is made, operation continues with 704.

At 704, once the virtual controller has been associated with the grasped object, the physical controller may be used to manipulate the grasped object. For example, a controller button may be used to operate a function of the grasped object. Thus, the grasped object may be used in the computer-generated environment. Operation then continues with 710.

At 710, it is determined if the user has dropped the grasped object. In one aspect of the disclosure, the user may use a button on the physical controller to provide a drop signal and indicate that the grasped object, now referred to as a "discarded object", is to be dropped. If the use does not wish to drop the grasped object, then operation returns to 704. Otherwise, operation continues with 712

At 712, where it has been determined that the user wishes to drop the grasped object, the discarded object may be left in the computer-generated environment at a location where it is dropped by assigning the coordinates where the drop event was determined to the current coordinates of the discarded object. Further, the controller button on the physical controller that was used to manipulate the grasped object may be disconnected from any functioning of the discarded object. After the discarded object has been dropped, operation 700 ends.

In accordance with various aspects of the disclosure, the object selection and grasping functionality described herein may be applied to implement interfaces for various types of applications in a computer-generated environment that are intuitive. For example, painting and drawing are interactive processes that often requires the use of two hands within the computer-generated environment. However, current approaches to providing interfaces for these processes are cumbersome, requiring users to open and select menus and submenus to perform simple tasks. For example, to select a particular painting tool (e.g., a paintbrush) and paint color, a user is typically required to locate and bring up a menu of tools, scroll to the desired painting tool (e.g., the paintbrush), and select it. The user has to then locate and bring up another menu or a user interface element such as a color wheel to select a desired paint color before the user may begin to paint. The user must engage in the latter activity of navigating through a menu every time the user desires to change the paint color.

Figure 8:
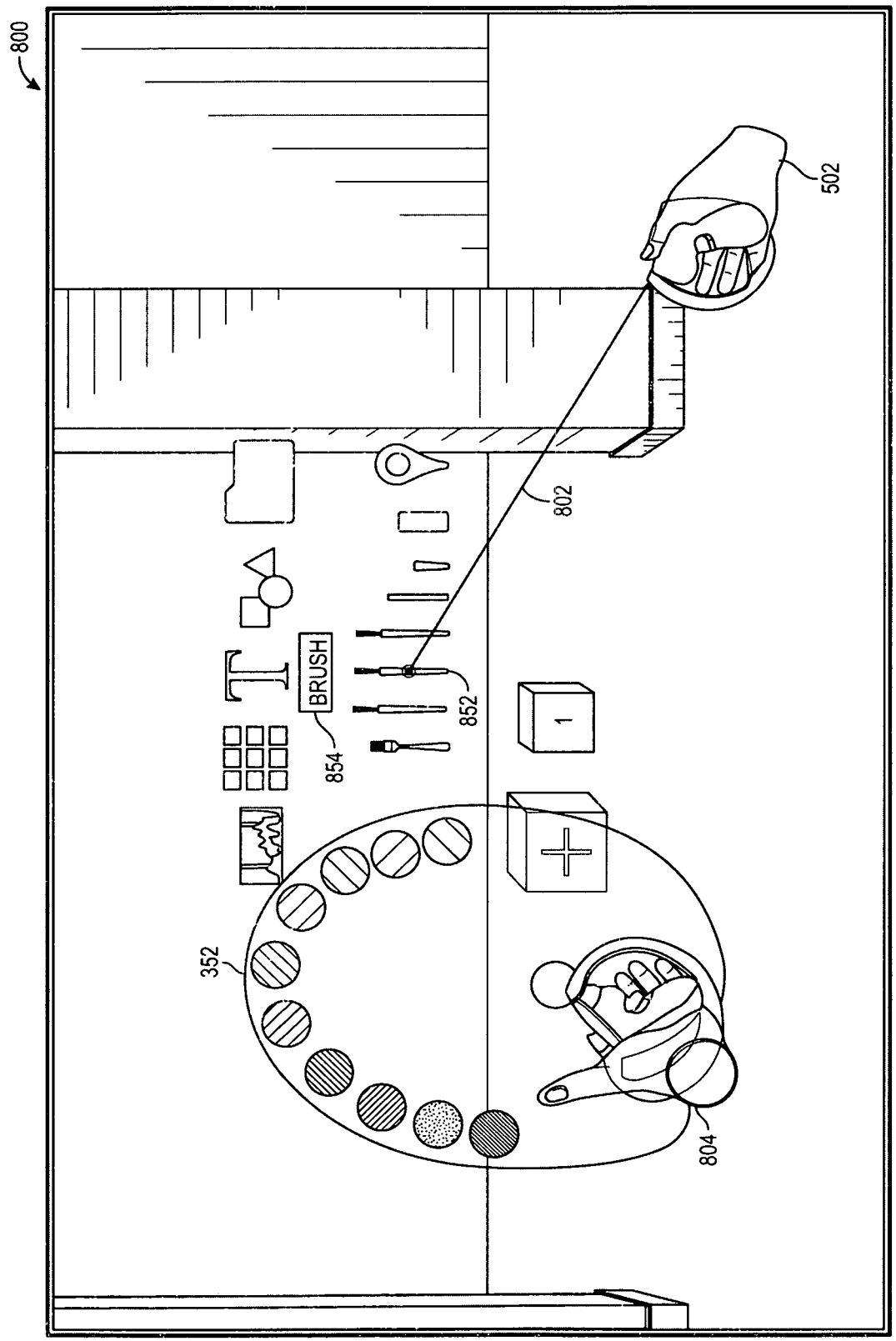
FIG. 8 to FIG. 13 illustrates various views of the computer-generated environment that may be displayed to the user in interacting with other virtual objects in the computer-generated environment.

Continuing with the example scenario illustrated from FIG. 2 to FIG. 6 where the user has selected and grasped a tool such as the paint palette 352, the user now desires to select another virtual object such as another tool to use with the paint palette. FIG. 8 illustrates a 2-D rendering of a view 800 seen by the user through the head-mounted display of the highlighting of a second tool, a brush 854, using a displayed label 854 ("Brush") for the brush 854, and change in color and size (the brush has been enlarged with respect to the other adjacent tools) described herein. In the example, the user is interested in selecting the brush 854 to use with the paint palette 352 grasped earlier by the user. As further described herein, a visual cue, displayed as a second visual cue 802 in the head-mounted display, may be manipulated by the user along with the user interacting with buttons on one or more physical controllers to indicate interest by the user in selecting and grasping (activating) the brush 852, similar to the description for the selection and activation of the paint palette 502 provided above using object space intersection detection.

Referring to FIG. 8, it may be seen that the paint palette 352 has been shifted by the user from a virtual right hand of the user, represented by the virtual controller 502, to a virtual left hand, represented by a virtual controller 804, in the computer-generated environment. As described above, the user may effect a grasping of a virtual object such as the paint palette 352 by the virtual controller 804 from the virtual controller 502 through the use of a physical controller associated with the virtual controller 804 to move the virtual controller 804 in the computer-generated environment to touch the virtual object (i.e., cause an intersection of object spaces of the paint palette 352 and virtual controller 804) and activating a grasp button. Thus, virtual objects may "change hands" in the computer-generated environment without having to be dropped by one hand before being picked up by another.

Figure 9:
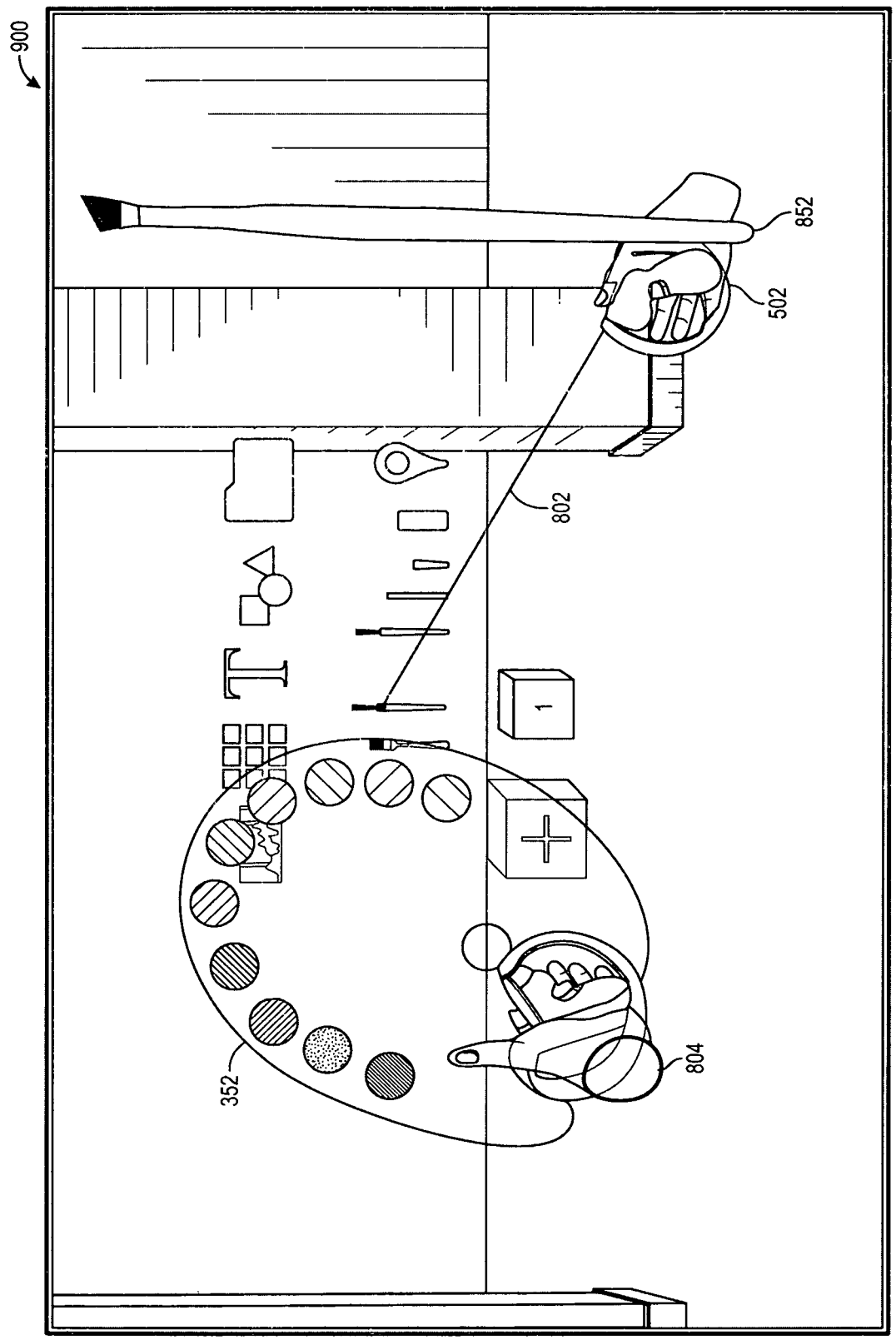
Figure 10:
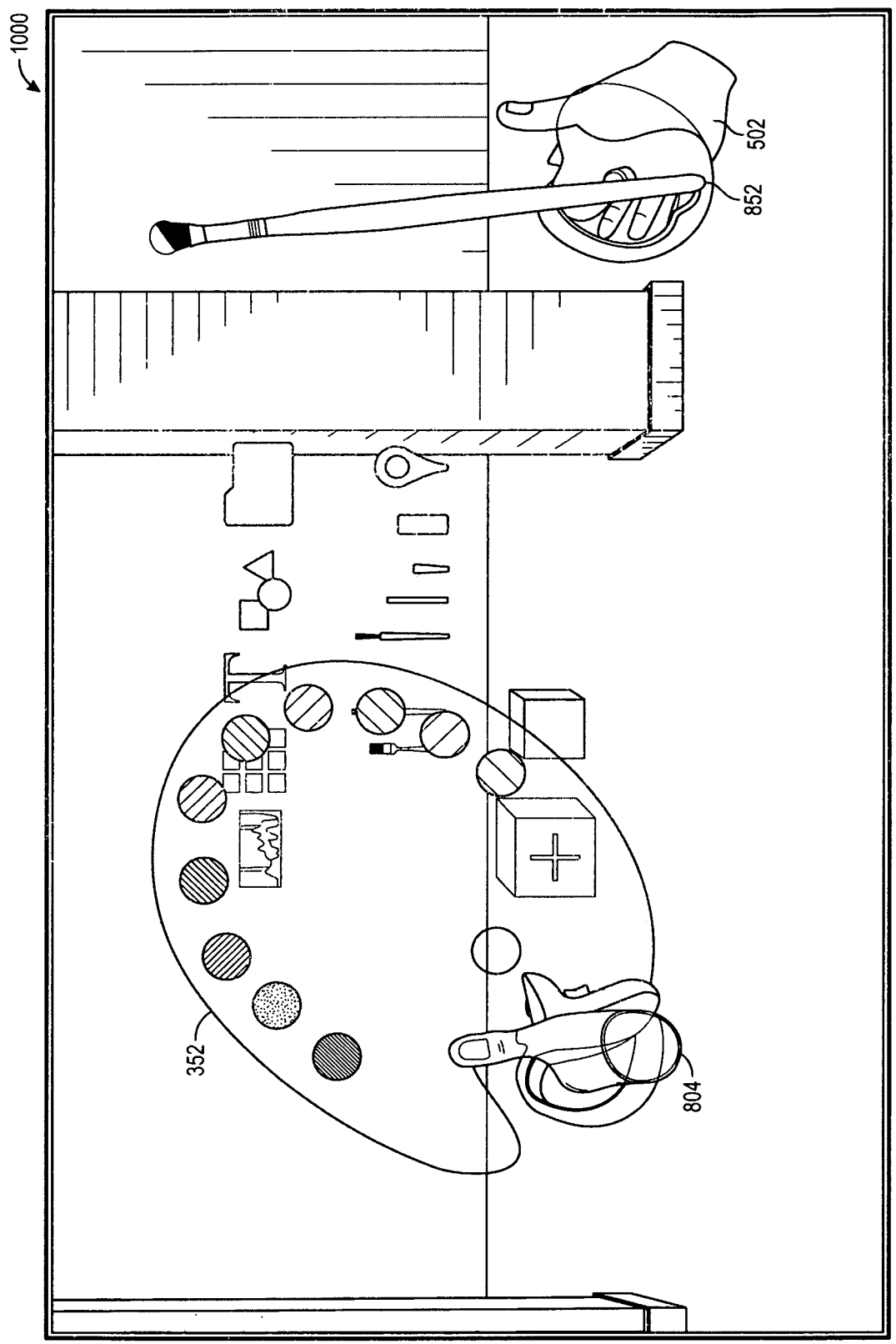

FIG. 9 and FIG. 10 illustrates 2-D renderings of views 900 and 1000, respectively, seen by the user through the head-mounted display for selection and grasping operations, respectively, that may be used for selecting and grasping the brush 852. These operations are similar the selecting and grasping operations as described for the paint palette 352, above, but applied to selection and grasping button detection as well as intersection detection between the virtual controller object space of the virtual controller 502 and the object space of the brush 852. In one aspect of the disclosure, the brush 852, when selected, may have a preconfigured associated paint color to allow the user to begin painting immediately. Most often, however, a preconfigured, default color is not typically the color desired by the user and the user will desire to immediately select another color.

Figure 11:
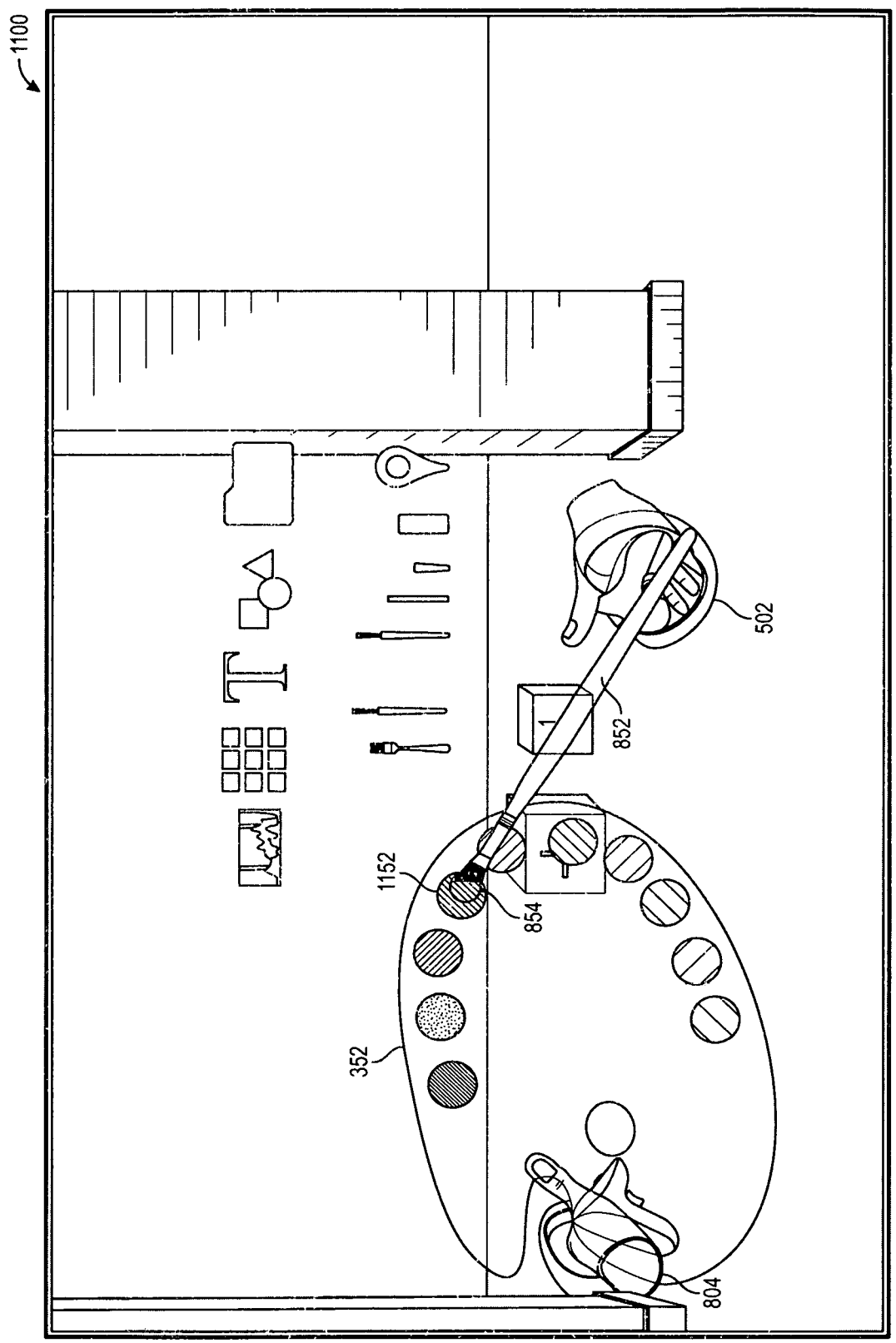

FIG. 11 illustrates a 2-D rendering of a view 1100 seen by the user through the head-mounted display that may be used to describe a process for selecting a paint color using the brush 852 and the paint palette 352. This paint color, referred to as an active paint color 1152, may be used as the paint color applied by the brush 852.

In one aspect of the disclosure, the paint palette is an object that has a variety of associated object space defined therewith in the computer-generated environment, one for each color on the paint palette. These object spaces may be referred to herein as "paint palette color object spaces" collectively or as a "paint palette color object space" individually. The brush 852 also includes an object space specifically defined for a tip 854 of the brush 852 in the computer-generated environment, referred to as a "brush tip object space". Performing detection of intersection of the brush tip object space with any one of the paint palette color object spaces provides detection of interaction by the user with the physical controllers to change the paint color for the brush 852. From the perspective of the user, the physical controllers would be used to move the virtual controllers 502 and 804 in the computer-generated environment so that the tip 854 of the brush 852 may be brought into contact with a paint color of interest on the paint palette 352.

In accordance with one aspect of the disclosure, the active paint color may be changed, upon detection of the interaction between the brush tip object space and the paint palette color object space, to the paint color associated with the paint palette color object space intersecting with the brush tip object space. In accordance with another aspect of the disclosure, a selection signal may also be required to be detected before the active paint color is changed. The user may provide the selection signal using a button on one of the physical controllers.

Figure 12:
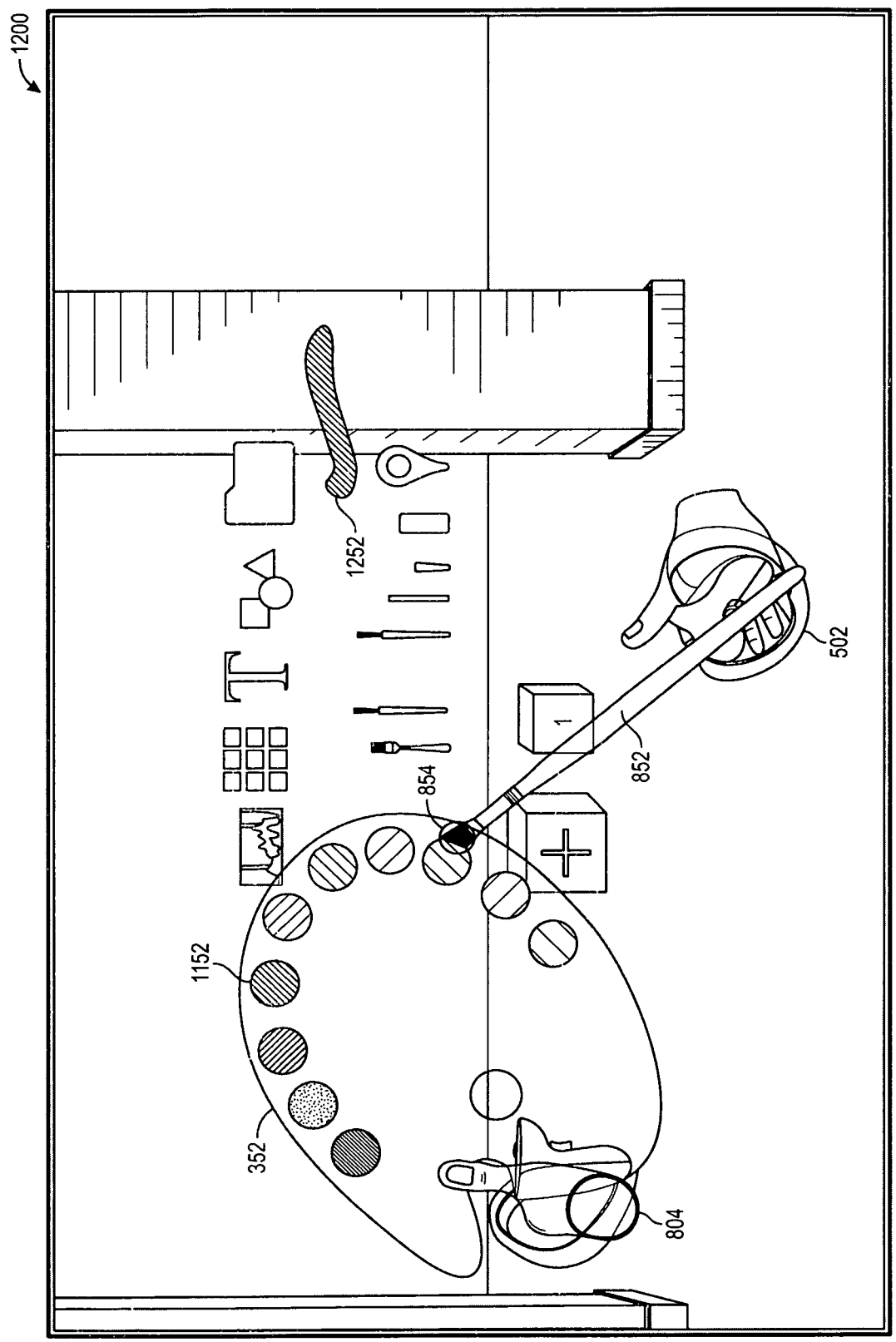

FIG. 12 illustrates a 2-D rendering of a view 1200 seen by the user through the head-mounted display where the user has applied the active paint color 1152 by interacting with the brush 852 to brush on a streak of applied paint 1252 in the computer-generated environment. The streak of applied paint 1252 has a geometry that may be based on a shape that is predetermined for the brush 852. In accordance with one aspect of the disclosure, the active paint color 1152 may be applied in the computer-generated environment by detection of an activation signal provided by the user using an activation button on one of the physical controllers. The active paint color 1152 would be applied at the current location of the brush tip 854, which may be the predetermined geometry noted above. In another aspect of the disclosure, the active paint color 1152 may be applied by detection of an intersection of the brush tip object space with an object space of any object in the computer-generated environment. For example, a virtual canvas object (not shown) may be provided in the computer-generated environment, and the virtual canvas object may include an object space implemented as a virtual canvas object space. A detection of the intersection of the brush tip object space with a point on the virtual canvas object space would result in the active paint color 1152 being applied at the point of the intersection.

Figure 13:
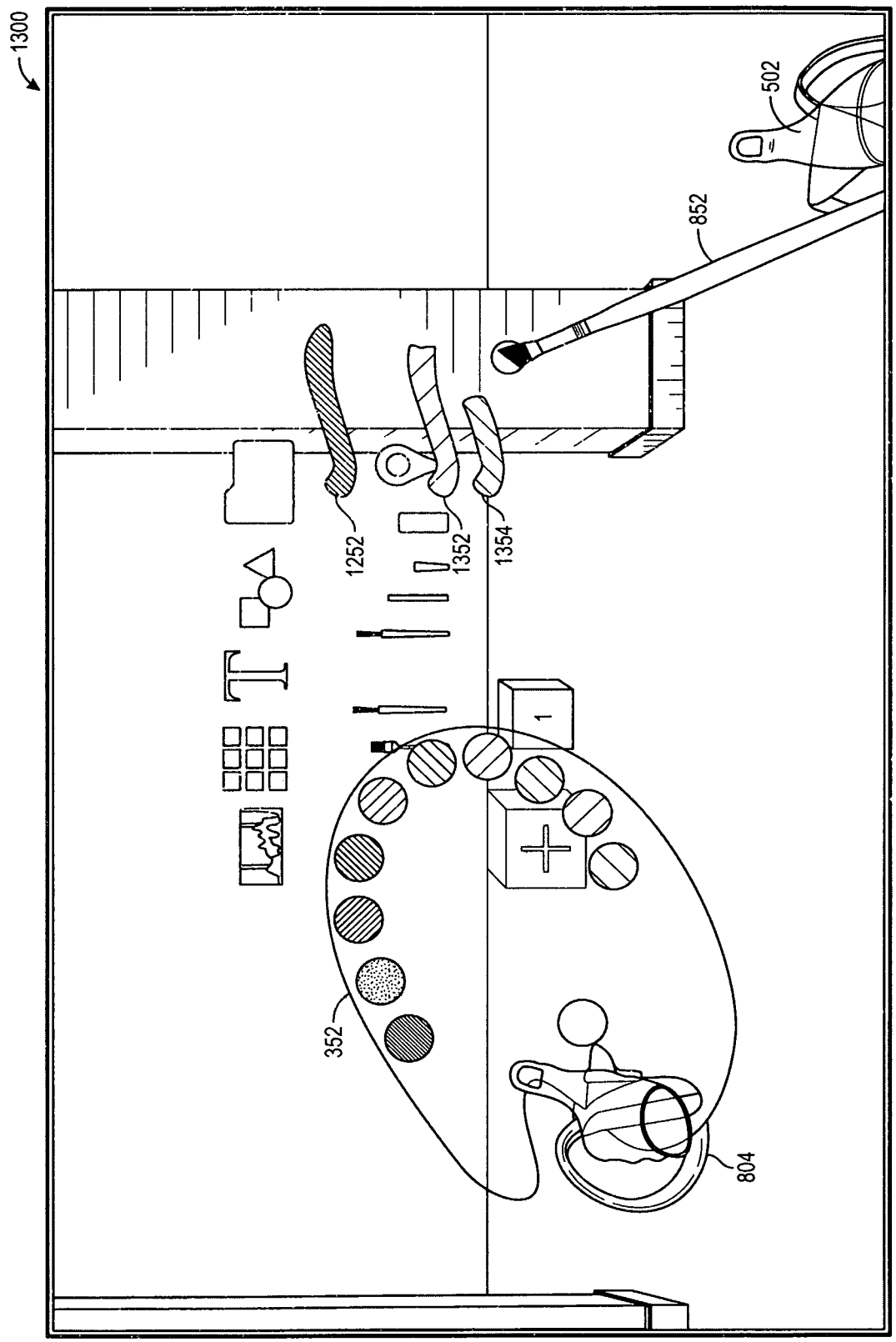

FIG. 13 illustrates a 2-D rendering of a view 1300 seen by the user through the head-mounted display, where the user has changed the active paint color two more times and has applied paint to the computer-generated environment each time to create a second and third streaks of applied paint 1352 and 1354, respectively.

The description contained herein mention the use of coordinates, which should be understood to be Euclidean space (x,y,z) floating point values. For example, various references to an object space, which may be defined as a volume in 3-D space with a center given as CENTER{x,y,z} having a width of length 2a, a height of length 2b, and a depth of length 2c. However, those of ordinary skill in the art should understand that other coordinate systems may be used. In addition, an object geometry may be defined to have no volume and may be a plane or a line (2-D), or even a single coordinate.

Preferably, all values used in any calculation are floating point values.

Although various aspects of the disclosed method and apparatus for tool selection and operation in a computer-generated environment has been described using language that infers the computer-generated environment is in a VR environment, those of ordinary skill in the art would understand that these aspects would apply equally to other computer-generated environment implementations, such as AR environments. Consequently, no unnecessary limitation should be placed on the applicability of the disclosed aspects and the interpretations of any claims therefor.

FIG. 14 is a conceptual diagram illustrating an example of a hardware implementation for an apparatus 1400 employing a processing system 1410 that may be used to implement various aspects of the method and apparatus for tool selection and operation in a computer-generated environment disclosed herein.

For example, the processing system 1410 includes one or more processors illustrated as a processor 1414. Examples of processors 1414 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processing system 1410 may be implemented as having a bus architecture, represented generally by a bus 1412. The bus 1412 may include any number of interconnecting buses and bridges depending on the specific application of the processing system 1410 and overall design constraints. The bus 1412 links together various circuits including one or more processors (represented generally by the processor 1414), a memory 1418, and computer-readable media (represented generally by a computer-readable medium 1416). The bus 1412 may also link various other circuits such as timing sources, peripherals, voltage regulators, and power management circuits, which are well known in the art, and therefore, will not be described any further. A bus interface 1420 provides an interface between the bus 1412 and a transceiver 1450. The transceiver 1450 provides a means for communicating with various other apparatus over a transmission medium.

The bus interface 1420 interfaces with a user interface portion 1440 that may include a head-mounted display 1442 and one or more physical controllers 1444. The head-mounted display 1442 and the one or more physical controllers 1444 are described above. For example, each of the one or more physical controllers 1444 may include a switch to activate a visual cue and a selection button to select an object of interest, as discussed with respect to FIG. 1. Depending upon the nature of the apparatus, other hardware such as keypads, displays, speakers, microphones, and joysticks may also be provided for the user interface 1440.

The processor 1414 is responsible for managing the bus 1412 and general processing, including execution of software that may be stored on the computer-readable medium 1416 or the memory 1418. The software, when executed by the processor 1414, causes the processing system 1410 to perform the various functions described herein for any particular apparatus. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 1416 or the memory 1418 may also be used for storing data that is manipulated by the processor 1414 when executing software. For example, this data may include data structures and databases necessary to implement the computer-generated environment and objects that reside therein.

The computer-readable medium 1416 may be a non-transitory computer-readable medium such as a computer-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. Although illustrated as residing in the processing system 1410, the computer-readable medium 1416 may reside externally to the processing system 1410, or distributed across multiple entities including the processing system 1410. The computer-readable medium 1416 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The processing system 1410 also includes an object highlight/selection/activation processing module 1430 that may be used to implement the highlighting and selecting operations described above with reference to FIG. 1 and the further details provided with respect to the grasping (activating) operation described with reference to FIG. 7. For example, the object highlight/selection/activation processing module 1430 may be used to highlight a virtual object to display a label, change a color, or a size of the virtual object that becomes an object of interest. The object highlight/selection/activation processing module 1430 may also provide for the animation of any object of interest that is selected. Further, the object highlight/selection/activation processing module 1430 may also provide for the association of the selected object to a virtual controller to become a grasped (activated) object.

In one aspect of the disclosure, the object highlight/selection/activation processing module 1430 may provide a method for object interaction in a computer-generated environment, where the method includes providing a virtual controller having a graphical representation of a physical controller associated with a user for interacting with a virtual object displayed at a first position in the computer-generated environment, wherein the virtual controller further includes a set of coordinates. The object highlight/selection/activatic from the physical controller during a detected intersection between the vector and the virtual object; and updating the computer-generated environment with the virtual object displayed at a second location based on the receipt of the selection signal, wherein the second location includes an updated location determined with respect to the vector.

In another aspect of the disclosure, the object highlight/selection/activation processing module 1430 may further provide for associating the virtual object with the virtual controller. Where the virtual controller and the virtual object each includes a respective object space, the association of the virtual object with the virtual controller may include receiving an activation signal from the physical controller during a detected intersection between the virtual controller and the virtual object that includes an intersection between the respective object spaces.

In yet another aspect of the disclosure, where the virtual object includes a first graphical representation in the computer-generated environment before the association of the virtual object with the virtual controller, the object highlight/selection/activation processing module 1430 may further provide for changing the first graphical representation of the virtual object to a second graphical representation to provide visual feedback in the computer-generated environment indicating the association of the virtual object with the virtual controller.

In still yet another aspect of the disclosure, where the vector includes an orientation determined with respect to the virtual controller, the object highlight/selection/activation processing module 1430 may further provide for determining a change in the orientation of the vector based on a movement of the physical controller; and updating the visual cue based on the determined change in the orientation of the vector.

In still yet another aspect of the disclosure, the object highlight/selection/activation processing module 1430 may further provide for determining an identifier associated with the virtual object; and providing an updated graphical representation of the virtual object in the computer-generated environment using the identifier.

In still yet another aspect of the disclosure, where the vector includes an origin determined with respect to the virtual controller, the object highlight/selection/activation processing module 1430 may provide for determining a first set of coordinates associated with the first position of the virtual object; determining a second set of coordinates with reference to the origin of the vector; and providing an animation of the virtual object moving from the first set of coordinates to the second set of coordinates.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects, a computer program product may comprise packaging materials.

What is claimed is:

1. An apparatus for providing object interaction in a computer-generated environment, comprising:
    an interface configured to communicate with a physical controller associated with a user to allow the user to interact with a virtual object displayed at a first location in the computer-generated environment;
    at least one processor coupled to the interface; and
    a memory coupled to the at least one processor, wherein the memory is configured to cause the at least one processor to:
        provide a virtual controller comprising a graphical representation of the physical controller in the computer-generated environment, wherein the virtual controller further comprises a set of coordinates;
        display a visual cue in the computer-generated environment generated from a vector comprising an origin determined from the set of coordinates;
        receive a selection signal from the physical controller during a detected intersection between the vector and the virtual object;
        update the computer-generated environment with the virtual object displayed at a second location based on the receipt of the selection signal, wherein the second location is the origin; and
        provide an animation of the virtual object moving from the first location to the second location;
        determine that the animation of the virtual object moving from the first location to the second location has caused an object space of the virtual object to intersect with an object space of the virtual controller;
        in response to the determination that the object space of the virtual object has intersected with the object space of the virtual controller, halt the animation of the virtual object moving from the first location to the second location;
        receive, from the physical controller, an activation signal indicating that the user wishes to grasp the virtual object;
        complete, based on receipt of the activation signal, the animation of the virtual object moving from first location to the second location; and
        in response to the virtual object reaching the second location, present an animation of the user grasping the virtual object.

2. The apparatus of claim 1, wherein the memory is further configured to cause the at least one processor to:
    associate the virtual object with the virtual controller based on the intersection between the respective object spaces.

3. The apparatus of claim 2, wherein the virtual object comprises a first graphical representation in the computer-generated environment before the association of the virtual object with the virtual controller, and the memory is further configured to cause the at least one processor to:
    change the first graphical representation of the virtual object to a second graphical representation to provide visual feedback in the computer-generated environment indicating the association of the virtual object with the virtual controller.

4. The apparatus of claim 1, wherein the vector comprises an orientation determined with respect to the virtual controller, and the memory is further configured to cause the at least one processor to:
 determine a change in the orientation of the vector based on a movement of the physical controller; and
 update the visual cue based on the determined change in the orientation of the vector.

5. The apparatus of claim 1, wherein the memory is further configured to cause the at least one processor to:
 determine an identifier associated with the virtual object; and
 provide an updated graphical representation of the virtual object in the computer-generated environment using the identifier.

6. A method of object interaction in a computer-generated environment, comprising:
 providing a virtual controller comprising a graphical representation of a physical controller associated with a user for interacting with a virtual object displayed at a first location in the computer-generated environment, wherein the virtual controller further comprises a set of coordinates;
 displaying a visual cue in the computer-generated environment generated from a vector comprising an origin determined from the set of coordinates;
 receiving a selection signal from the physical controller during a detected intersection between the vector and the virtual object;
 updating the computer-generated environment with the virtual object displayed at a second location based on the receipt of the selection signal, wherein the second location is the origin;
 providing an animation of the virtual object moving from the first location to the second location;
 determining that the animation of the virtual object moving from the first location to the second location has caused an object space of the virtual object to intersect with an object space of the virtual controller;
 in response to determining that the object space of the virtual object has intersected with the object space of the virtual controller, halting the animation of the virtual object moving from the first location to the second location;
 receiving, from the physical controller, an activation signal indicating that the user wishers to grasp the virtual object;
 completing, based on receipt of the activation signal, the animation of the virtual object moving from the first location to the second location; and
 in response to the virtual object reaching the second location, presenting an animation of the user grasping the virtual object.

7. The method of claim 6, further comprising:
 associating the virtual object with the virtual controller.

8. The method of claim 7, wherein the virtual object comprises a first graphical representation in the computer-generated environment before the association of the virtual object with the virtual controller, and the association of the virtual object with the virtual controller comprises:
 changing the first graphical representation of the virtual object to a second graphical representation to provide visual feedback in the computer-generated environment indicating the association of the virtual object with the virtual controller.

9. The method of claim 6, wherein the vector comprises an orientation determined with respect to the virtual controller, and wherein the display of the visual cue comprises:
 determining a change in the orientation of the vector based on a movement of the physical controller; and
 updating the visual cue based on the determined change in the orientation of the vector.

10. The method of claim 6, wherein the highlighting of the virtual object comprises:
 determining an identifier associated with the virtual object; and
 providing an updated graphical representation of the virtual object in the computer-generated environment using the identifier.

11. A non-transitory computer-readable storage medium comprising code for:
 providing a virtual controller comprising a graphical representation of a physical controller associated with a user for interacting with a virtual object displayed at a first location in a computer-generated environment, wherein the virtual controller further comprises a set of coordinates;
 displaying a visual cue in the computer-generated environment generated from a vector comprising an origin determined from the set of coordinates;
 receiving a selection signal from the physical controller during a detected intersection between the vector and the virtual object;
 updating the computer-generated environment with the virtual object displayed at a second location based on the receipt of the selection signal, wherein the second location is the origin;
 providing an animation of the virtual object moving from the first location to the second location;
 determining that the animation of the virtual object moving from the first location to the second location has caused an object space of the virtual object to intersect with an object space of the virtual controller;
 in response to determining that the object space of the virtual object has intersected with the object space of the virtual controller, halting the animation of the virtual object moving from the first location to the second location;
 receiving, from the physical controller, an activation signal indicating that the user wishes to grasp the virtual object;
 completing, based on receipt of the activation signal, the animation of the virtual object moving from the first location to the second location; and
 in response to the virtual object reaching the second location, presenting an animation of the user grasping the virtual object.

12. The non-transitory computer-readable storage medium of claim 11, further comprising code for:
 associating the virtual object with the virtual controller.

13. The non-transitory computer-readable storage medium of claim 12, wherein the virtual object comprises a first graphical representation in the computer-generated environment before the association of the virtual object with the virtual controller, and the code for association of the virtual object with the virtual controller comprises code for:
 changing the first graphical representation of the virtual object to a second graphical representation to provide visual feedback in the computer-generated environment indicating the association of the virtual object with the virtual controller.

14. The non-transitory computer-readable storage medium of claim 11, wherein the vector comprises an orientation determined with respect to the virtual controller, and wherein the code for the display of the visual cue comprises code for:
   determining a change in the orientation of the vector based on a movement of the physical controller; and
   updating the visual cue based on the determined change in the orientation of the vector.

15. The non-transitory computer-readable storage medium of claim 11, wherein the code for highlighting of the virtual object comprises code for:
   determining an identifier associated with the virtual object; and
   providing an updated graphical representation of the virtual object in the computer-generated environment using the identifier.

* * * * *

UNITED STATES PATENT AND TRADEMARK OFFICE
CERTIFICATE OF CORRECTION

PATENT NO. : 10,564,800 B2
APPLICATION NO. : 15/902640
DATED : February 18, 2020
INVENTOR(S) : Kyle W. Cooper et al.

It is certified that error appears in the above-identified patent and that said Letters Patent is hereby corrected as shown below:

In the Claims

Column 17, Line 51, delete "wishers" and insert -- wishes --, therefor.

Signed and Sealed this
Seventh Day of July, 2020

Andrei Iancu
*Director of the United States Patent and Trademark Office*